United States Patent [19]
Chaney

[11] Patent Number: 5,237,390
[45] Date of Patent: Aug. 17, 1993

[54] METHOD AND APPARATUS FOR MEASUREMENT OF ANGULAR DISPLACEMENT

[75] Inventor: Raymond J. Chaney, Berkeley, United Kingdom

[73] Assignee: Renishaw plc, Gloucestershire, United Kingdom

[21] Appl. No.: 820,695

[22] PCT Filed: Jun. 17, 1991

[86] PCT No.: PCT/GB91/00968
§ 371 Date: Jan. 27, 1992
§ 102(e) Date: Jan. 27, 1992

[87] PCT Pub. No.: WO91/19958
PCT Pub. Date: Dec. 26, 1991

[30] Foreign Application Priority Data
Jun. 15, 1990 [GB] United Kingdom ............... 9013390

[51] Int. Cl.⁵ .................................................. G01B 11/00
[52] U.S. Cl. ............................... 356/363; 356/345; 356/349; 356/372; 250/231.13; 33/1 N
[58] Field of Search ............... 356/363, 372, 345, 349; 250/231.13; 33/1 N, 1 L

[56] References Cited
U.S. PATENT DOCUMENTS
4,529,310 7/1985 Matsuda et al. ............... 356/363

Primary Examiner—Samuel A. Turner
Assistant Examiner—LaCharles Keesee
Attorney, Agent, or Firm—Oliff & Berridge

[57] ABSTRACT

A rotable object table which has a stator (112) a rotor (114), and positioning servo and measuring system (16). The system (16) is calibrated using an angular interferometer and an intermediate table having stator 122 and rotor 124. Values of angular displacement of stator 124 are determined by the interferometer by solving 3 orthogonal simultaneous equations derived from the equation $R + R_o = K \sin(\Theta - \Theta_o)$, and are compared with corresponding angular displacement as determined by the system (16).

8 Claims, 4 Drawing Sheets

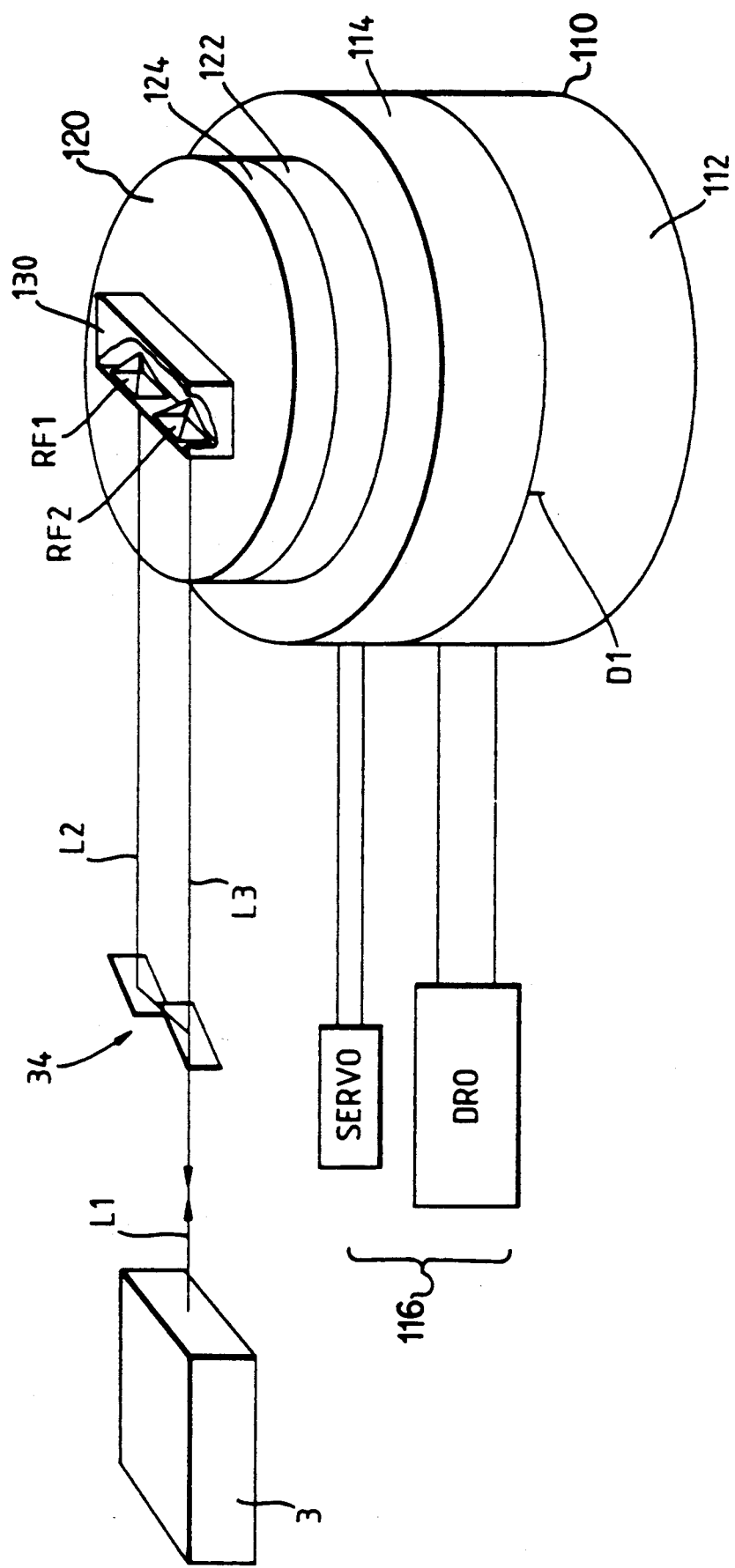

METHOD AND APPARATUS FOR MEASUREMENT OF ANGULAR DISPLACEMENT

BACKGROUND OF THE INVENTION

1. Field of the Invention

The present invention relates to the measurement (for example the calibration) of angular displacement of a rotary table. For a proper understanding of the present invention and its advantages, it is first necessary to consider the prior art.

2. Description of the Related Art

FIG. 1 illustrates a prior art calibration apparatus. The apparatus comprises an object table 10 having a stator 12 and rotor 14. The rotor 14 has a positioning system 16 for positioning the rotor 14 relative a datum D1 provided on the stator 12. The positioning system 16 typically comprises e.g. a position servo 17 which responds to demand data from a user to position the rotor 14 relative to stator 12, together with an encoder (not shown) whose output is displayed on a digital read-out DRO. Mounted to the object table 10 is an intermediate table 20 having a stator 22, fixedly mounted to the rotor 14 of the object table 10, and a rotor 24 having a scale 26 for determining angular displacement of the rotor 24 relative to the datum D1. The scale 26 provided on the rotor 24 of the intermediate table 20 is an exceedingly accurate scale; typically accurate to within 0.1"arc second. The object of a calibration operation is to calibrate the positioning system 16 of the object table 10.

To this end the rotor 24 supports a housing 30 for a pair of retro-reflectors RF1 and RF2 which form part of an angular interferometer measurement system (also shown in FIG. 2). The angular interferometer comprises a laser beam L1 emitted from a laser 32 which is split by a beam splitter 34 into two parallel beams L2 and L3. The beams L2 and L3 are incident respectively upon retro-reflectors RF1 and RF2, and consequently returned upon their incident path to interfere with each other at a detector (not shown). Rotation of the retro-reflector housing 30 about axis A, (as a result of rotation of the rotor 24) causes a shift in the interference fringes in the interfering beam at the detector. If the interferometer has been datumed with the retro-reflectors RF1 and RF2 lying in a plane exactly perpendicular to the incoming beams L2 and L3, then the following equation holds true:

$$R = K \sin \Theta \quad (1)$$

where:

$\Theta$ is the angular displacement

R is the number (not necessarily a whole number) of interference fringes; and

K is known as the scale factor and:

$$K = 2Dn/\lambda_o \quad (2)$$

where

D is the distance between the retro-reflectors RF1 and RF2 n is the refractive index of air $\lambda_o$ is the wavelenth of the laser light in a vacuum.

Calibration of the positioning system 16 of the object table 10 is achieved by first of all datuming the interferometer so that the retro-reflectors RF1 and RF2 are as close as possible to a position perpendicular to the beams L2 and L3. Thereafter, for all operations and calculations, exact orthogonality of beams L2 and L3, and retro-reflectors RF1 and RF2 is assumed. The positioning system 16 is then used to rotate the rotor 14 to a given angular displacement (e.g. 120°) as measured by the positioning system, and counter-rotating the rotor 24 of the intermediate table by the same amount (as measured by the scale 26 of the intermediate table). Any net angular displacement from the datum between the two rotations (as a result of an inaccurate rotation of rotor 14 by the positioning sytem 16) is measured using the interferometer. Thus, the following relationship holds true:

$$\Theta_{object\ table} = \Theta_{intermediate\ table} + \Theta_{Interferometer} \quad (3)$$

where:

$\Theta_{interferometer}$ is the angle calculated from differential linear displacement of the retro-reflectors RF1 and RF2 from the datum position mentioned above (when the plane in which the retro-reflectors RF1 and RF2 lie is perpendicular to the incident beams L2 and L3).

Subsequent calibrations of other angular displacements (for example 121°) are performed by once again rotating the rotor 14 from the datum position to the displacement to be calibrated.

In practice, the rotor 24 of the intermediate table 20 is effectively "counter-rotated" by constraining the rotor 24 from moving during rotation of the rotor 14. This method of "counter-rotating" has a number of advantages:

a) Firstly, it ensures that the laser beam incident upon, and reflected from the retroreflectors remains unbroken.

b) Secondly, it obviates the need to provide a positioning system for the intermediate table.

c) Finally, it reduces the errors in the calibration.

This is because the error on $\Theta_{interferometer}$, $\Delta\Theta$ is given by the following expression:

$$\Delta\Theta = (R^2 \Delta K^2 + K^2 \Delta R^2)^{\frac{1}{2}} \quad (4)$$

inevitably, because the operation is carried out over a number of hours, the value of the scale factor K will vary over the time required to perform the calibration; typically, as a result in a variation of the temperature of the air (thus altering the refractive index of air). In the above equation, the term giving the variation in K ($\Delta K$) is multiplied by R, and since R increased with increasing $\Theta$ the error in the measurement of angular displacement ($\Delta\Theta$) is directly proportional to the magnitude of angular displacement. Thus, for example, measurement of an angular displacement of 1° will have half the error due to the variation in K, compared with a measurement of an angular displacement of 2°. It is thus typically necessary in the prior art method, in order to achieve the desired accuracy, to constrain the rotation of the retro-reflector housing 30 (i.e. $\Theta_{interferometer}$) to a maximum of approximately 1°.

Thus, the prior art method has the disadvantages of requiring an extremely accurate, highly expensive intermediate table 20, and the requirement of restricting the rotation of the rotor 24. These disadvantages are in addition to the disadvantage associated with the stringent datuming requirements for the interferometer which inspite of being time continuing introduces error into the data.

SUMMARY OF THE INVENTION

The present invention provides a method which obviates the need for the exceedingly accurate, and highly expensive intermediate table; the present invention also allows much larger rotations of rotor 24. The present invention obviates the need to assume an accurate datum position for the retro-reflectors (and thus obviates the need to accurately datum the interferometer).

BRIEF DESCRIPTION OF THE DRAWINGS

Embodiments of the present invention will now be described by way of example, and with reference to the accompanying drawings, in which:

FIG. 3 shows an apparatus according to the present invention:

DETAILED DESCRIPTION OF THE PREFERRED EMBODIMENTS

Figure 1:
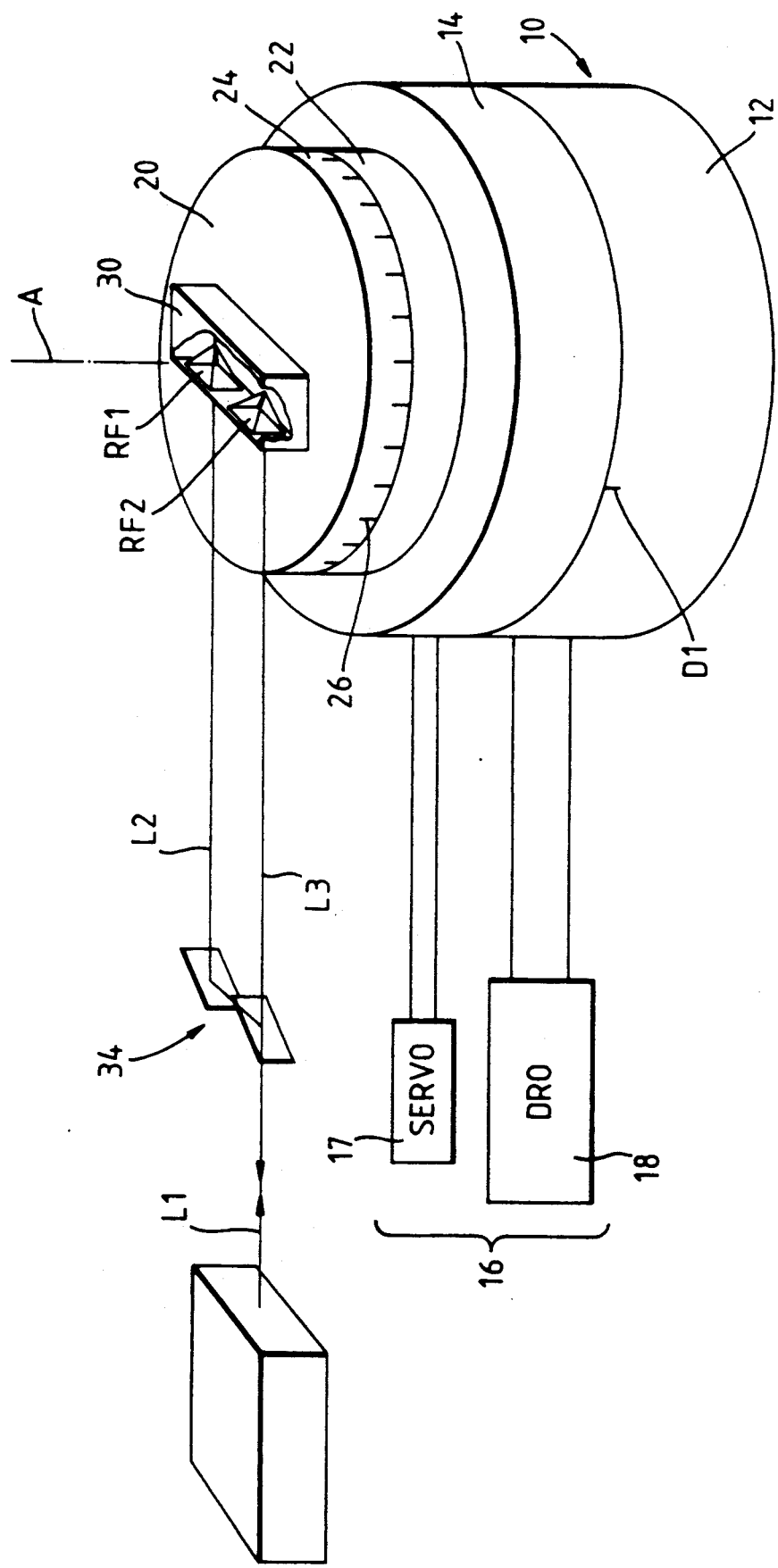
FIG. 1 shows a prior art apparatus.
Figure 2:
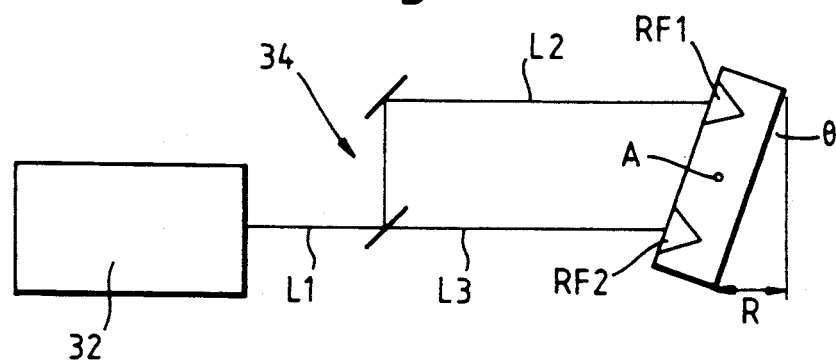
FIG. 2 shows an angular interferometer.

The apparatus of the present invention operates upon the assumption that the behavior of the apparatus is described by the following equation:

$$R + Ro = K \sin(\Theta - \Theta o) \quad (5)$$

where:

R is the interferometer reading;
Ro is the offset in the interferometer reading;
K is a scale factor;
$\Theta$ is the angular displacement as measured by a table;
and $\Theta o$ is the offset in the table reading $\Theta$.

This is because the equation $$R = K \sin \Theta \quad (6)$$

only applies for an interferometer which is datumed (i.e. "zeroed") when $\Theta$ is zero degrees, and the retro-reflectors RF1 and RF2 are normal to the incident beam L2 and L3. If the object table is registering an angle $\Theta o$ when the retro-reflectors are normal to the incident beam then $$R = K \sin(\Theta - \Theta o) \quad (7)$$

Furthermore if the interferometer is datumed when the retro-reflectors RF1 and RF2 are not normal to the beams L2 and L3, then there is an interferometer offset reading Ro, equal to:

$$Ro = K \sin(\Theta - \Theta o) \quad (8)$$

Where $(\Theta - \Theta o)$ is the angular misalignment of the retro-reflectors from a position normal to the incident beams when the interferometer was datumed. Because the datuming operation sets R to zero, for displacements after datuming the correct equation is given by equation (5), namely:

$$R + Ro = K \sin(\Theta - \Theta o)$$

The method of the present invention will now be described with reference to FIGS. 3 and 4. As with the prior art method, the apparatus comprises an object table 110, an intermediate table 120 and an angular measurement interferometer system. The retro-reflector housing 130 of the interferometer is secured to the rotor 124 of intermediate table 120. In the apparatus of the present invention the intermediate table 120 does not have (and does not need to have) a scale.

The stator 122 of the intermediate table 120 is fixedly attached to the rotor of 114 of the object table, such that the axis of rotation of the rotor 124 of the intermediate table 120 is co-linear with the axis of rotation of the rotor 114 of the object table 110 to approximately 1 mm. This is required to ensure that the retro-reflectors provide good signal strength for the interferometer throughout their permitted range of rotation (in this case ±15° from a notional zero which is approximately equal to the datum position in the prior art method). This is checked by rotating the retro-reflector housing 130 (by rotation of rotor 124) approximately 15° either side of the notional zero, then keeping the retro-reflector housing 130 stationary, rotating the object table by 90° and repeating the procedure. This is reiterated for two further rotations of the object table by 90° to ensure that throughout the 360° range of motion of the object table 110 signal strength will be maintained. If good signal strength is not obtained over 360° rotation, the position of the intermediate table is translated in order to more closely align its axis with that of the object table.

To start the calibration procedure, the rotor 114 of the intermediate table 120 is rotated to a position at which approximately maximum signal strength is obtained at the interferometer detector This position is a notional datum and is used as a reference position to ensure that all rotations of retro-reflector housing 130 are kept to within the rotational limits of the system (i.e. the limits at which a good signal can be obtained at the interferometer detector). The object table 110 and intermediate table 120 are then rotated together by approximately −15°. The interferometer reading ($R_{start}$) at this position is recorded (but not used for calibration data), and the object table 110 and intermediate table 120 are then rotated together by the positioning system 116 in the positive direction by 1° to the position at which the data collection for calibration starts. This joint rotation by −15° followed by a positive joint rotation of +1° prior to data collection removes mechanical backlash from the system and enables unidirectional data collection. Once the position at which data collection starts (approximately −14° from the notional datum position) has been attained, the object table 110 and intermediate table 120 are then rotated together by the positioning system approximately to the +15° position, in increments of 1°. At the position corresponding to each of these increments, an interferometer reading (R) is taken together with a measurement of the angular displacement of the rotor 114 from the datum position as measured by the DRO of the positioning system 116. This net rotation of 30° from the −15° position is defined as a zone having j readings (in this case 30) over a magnitude of angular displacement of approximately 29°, (since data collection started only at −14°). It should thus be borne in mind that the zone has an angular displacement of 30°, but that the 30 data points are taken over an an angular displacement of 29°. Once rotation through the zone is complete the object table 110 and intermediate table 120 are rotated together by −15°. The rotor 114 of the object table 110 together with the stator 122 of the intermediate table 120 (since these two parts are fixedly attached to each other) are then both locked to the stator 112 of the object table (which is locked to a mechanical earth). The rotor 124 of the intermediate table 120 is rotated a further $-15°$ (this time relative to the stator 122 and object table 110) to return the retro-reflector housing 130 (approximately) to the position ($R_{start}$) it occupied at the start of the rotation through the first zone 1. The rotor 124 of the intermediate table 120 is returned to the position ($R_{start}$) by monitoring the interferometer reading until it is the same as $R_{start}$ (to within approximately few minutes of arc). The procedure described above is then reiterated for further zones until the complete angular displacement range required has been calibrated.

It should be noted that since at the end of each zone the object and intermediate tables are rotated relative to each other by only approximately 15°, and each zone has an angular displacement of approximately 30°, a 360° calibration of the object table requires measurements taken in 24 overlapping zones each of a 30° angular displacement.

The data generated by this operation, i.e. interferometer readings R and angular displacement readings Θ (as provided by the positioning system 116 of the object table 110), is processed to yield a calibration in the following way.

$$(R+R_0)/K = \sin(\Theta - \Theta_0) \tag{9}$$

expanding the right hand side of the equation:

$$(R+R_0)/K = \sin\Theta \cos\Theta_0 - \cos\Theta \sin\Theta_0$$

$$R = -R_0 + A\sin\Theta + B\cos\Theta \tag{10}$$

Where:

$$A = K\cos\Theta_0, \quad B = -K\sin\Theta_0$$

expressing equation (2) in least squares fit analysis:

$$\Sigma R = -NR_0 + A\Sigma\sin\Theta + B\Sigma\cos\Theta \tag{11}$$

Where:

N is the number of readings summed.

It is possible to create from equation (9) two further equations defining a Hilbert Space, orthogonal both to equation (11) and each other:

$$\Sigma R \sin\Theta = -R_o\Sigma\sin\Theta + A\Sigma\sin^2\Theta + B\Sigma\sin\Theta\cos\Theta \tag{12}$$

$$\Sigma R \cos\Theta = -R_0\Sigma\cos\Theta + A\Sigma\sin\Theta\cos\Theta + B\Sigma\cos^2\Theta \tag{13}$$

For a given zone i, there are j data points. Once a complete set of measurements has been taken, there will be a data file:

$$\Theta_{ij}, R_{ij} \text{ for: } i=1\ldots 24 \text{ and } j=1\ldots 30$$

where:
  i is the zone
  j is a data point in zone i
  $\Theta_{ij}$ are values taken from the positioning system 116 of the machine,
  $R_{ij}$ are values taken from the interferometer.

To calibrate the positioning system of the object table we must determine the error $\epsilon_{ij}$ on values of $\Theta_{ij}$ of angular displacement as measured by the table, where:

$$\epsilon_{ij} = \Theta_{ij table} - \Theta_{ij interferometer} \tag{14}$$

and $\Theta_{ij interferometer}$ is the value of angular displacement of the object rotor calculated from the interferometer reading R.

The data points j for each zone i can be used to solve the simultaneous equations (11) to (13), in order to yield a value of $\Theta_{0i}$, $R_{0i}$, and $K_i$ for each zone i.

This will yield 24 values for $K_i$, a mean value is then taken simply in the following way:

$$\overline{K} = \Sigma_{i=1,24} K_i/24 \tag{15}$$

This value of $\overline{K}$ is re-introduced into e.g. equation (9), together with the previously calculated values of $\Theta_{0i}$, $R_{0i}$ in order to calculate a value of angular displacement $\Theta_{ij interferometer}$ from the interferometer reading R.

Next, the value ($\epsilon_{ij}$) for the error between the values of $\Theta_{ij}$ as measured by the interferometer, and as measured by the object table 110 is obtained using equation (14):

$$\epsilon_{ij} = \Theta_{ij table} - \Theta_{ij interferometer} \tag{14}$$

Since data points in 24 zones of 30° have been measured, and in each zone 30 readings were taken over an angular displacement of 29°, the angular displacement of each data point has been measured twice. Thus, we have two values for the measured error $\epsilon_{ij}$ for each data point. These two values of $\epsilon_{ij}$ are averaged together to obtain a more accurate value for the error in the displacement of the object table 110 in the following way.

Figure 4:
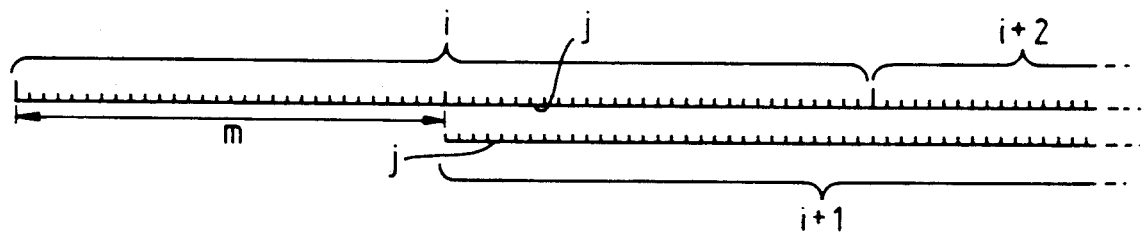
FIG. 4 is an illustration of data collected.

Referring to FIG. 4, three overlapping zones i, (i+1) and (i+2) are shown. Each of the zones corresponds to an angular displacement of approximately 30°, the ith zone going from 0° to 30°, the (i+1)th zone going from 15° to 45°, and the (i+2)th zone going from 30° to 60°. Each zone contains data points j, taken at approximately 1° increments over an angular displacement of 29° (thus the number of data points j in each zone i is 30). Thus, the zones i, and (i+1) have overlapping readings in the region of 15° to 30°. The error values $\epsilon_{ij}$ (of the ith zone) and $\epsilon_{i+1,j}$ (of the (i+1)th zone) may be related to each other in the following way:

$$\epsilon_{i,m+j} = \epsilon_{i+1,j} + \Theta_{off} \tag{16}$$

Where:

m is the number of data points j in the ith zone which precede the first data point in that zone duplicated by a data point j in the (i+1)th zone, and $\Theta_{off}$ is the offset in the overlap of the zones which occurs as a result of mid-points of the zones i and (i+1) being spaced from each other by an angular displacement of slightly less or greater than 15°.

To obtain a better value of $\Theta_{off}$, sum the errors $\epsilon_{ij}$ on the overlapping data points j in the two zones i and (i+1):

$$\Theta_{off} = [\Sigma_{j=1,N} \epsilon_{i,m+j} - \Sigma_{j=1,N} \epsilon_{i+1,j}]/N \tag{17}$$

Where:

N is the number of overlapping data points between the zones i and (i+1).

Having determined a value of $\Theta_{off}$, this can now be used to correct the error values $\epsilon_{i+1,j}$ so that they relate to the same origin of displacement of the rotor 114 of the object table 110 as the error points $\epsilon_{i,m+j}$. Thus, we perform the following operation:

$$\epsilon_{i+1,j} + \Theta_{off} \text{ for } j = 0, 1 \ldots 30 \tag{18}$$

This procedure must be repeated for the next zone, i.e. zone (i+2) whose errors values $\epsilon_{i+2,j}$ will be amended accordingly by a value of $\Theta_{off}$ as determined between the zones (i+1) and (i+2). This process is reiterated for all zones $i = 1 \ldots 24$.

Having done this, we now use the duplicity of error values on each data point to obtain an improved error value in respect of each data point. For example, for points common between the zones i, and (i+1) the best estimate:

$$\bar{\epsilon}_{ij} = (\epsilon_{i,m+j} + \epsilon_{i+1,j})/2 \tag{19}$$

N.B. bearing in mind that the values of $\epsilon_{i+1,j}$ have been corrected by $\Theta_{off}$.

Figure 5:
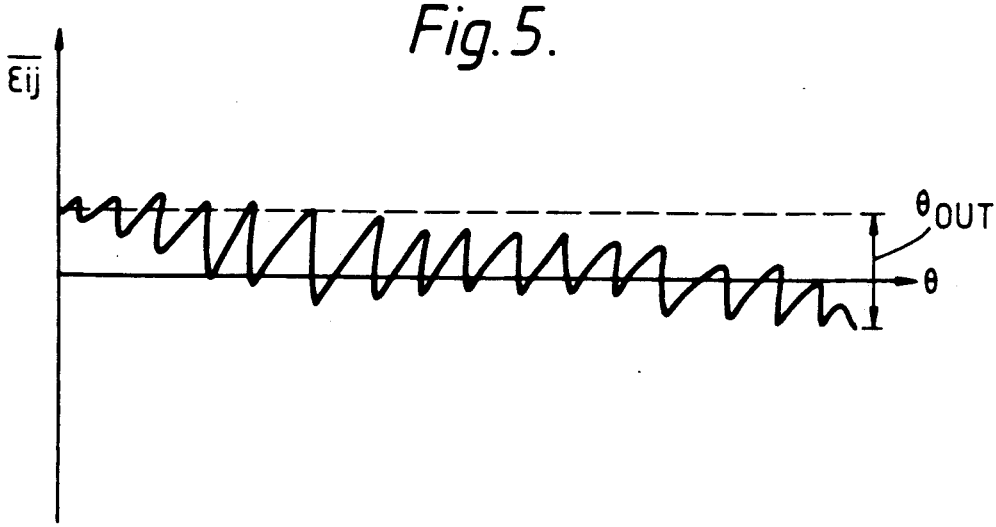
FIG. 5 is a calibration plot according to the present invention.

We now have for each demanded angular displacement of the rotor 114 of the object table 110 relative to its stator 112, a mean value of error, $\bar{\epsilon}_{ij}$. Typically, this yields a correction plot such as is shown in FIG. 5. It was expected, and has been found that the treatment of the above data has a tendency to systematically underestimate the value of $\bar{K}$. Since:

$$\sin^{-1}\left[\frac{\sin(\Theta + \epsilon) + \sin(\Theta - \epsilon)}{2}\right] < \Theta \tag{20}$$

Where the table has been rotated through 360° (as is the case in the plot in FIG. 5), the errors for the displacement at 0° and at 360° should correspond very closely, since they represent errors calculated for the same point. It can be seen from FIG. 5, that this is not the case, and that the two error values differ from each other by a value $\Theta_{out}$. The data plot may be corrected accordingly simply by adding the following value:

$$\Theta_{out} \times (\Theta/360°)$$

to each error value $\bar{\epsilon}_{ij}$ in the plot.

By generating the data in the form of two sets of overlapping zones, a number of problems are eliminated.

The first of these is that during counter rotation of the intermediate table 120 relative to the object table 110, some movement of the object table 110 will inevitably occur due for example to reaction forces (resulting from acceleration of the intermediate table), acting on the object table. If 12 zones were "butted" together linearly, the relative movement of intermediate 120 and object 110 tables would mean that an error value $\epsilon_{i,N}$ on the last data point 1 of N data points in a zone i, will not be the same as the error value $\epsilon_{i+1,1}$ on the first data point of the next zone (i+1); $\epsilon_{i+1,1}$ will be greater by the movement of the object table 110. Moreover it is likely that the magnitude of the relative movement of the object table 110 will be less than the error in the positioning system 116 due to mechanical backlash, and thus will not show up on the DRO of the positioning system 116. It is thus not generally possible simply to take a separate reading for the first data point of zone (i+1). The additionall error due to this relative movement is systematic, and so will not disappear through averaging. It is thus greatly advantageous to generate data in the manner of overlapping zones, which avoid this problem.

Figure 6:
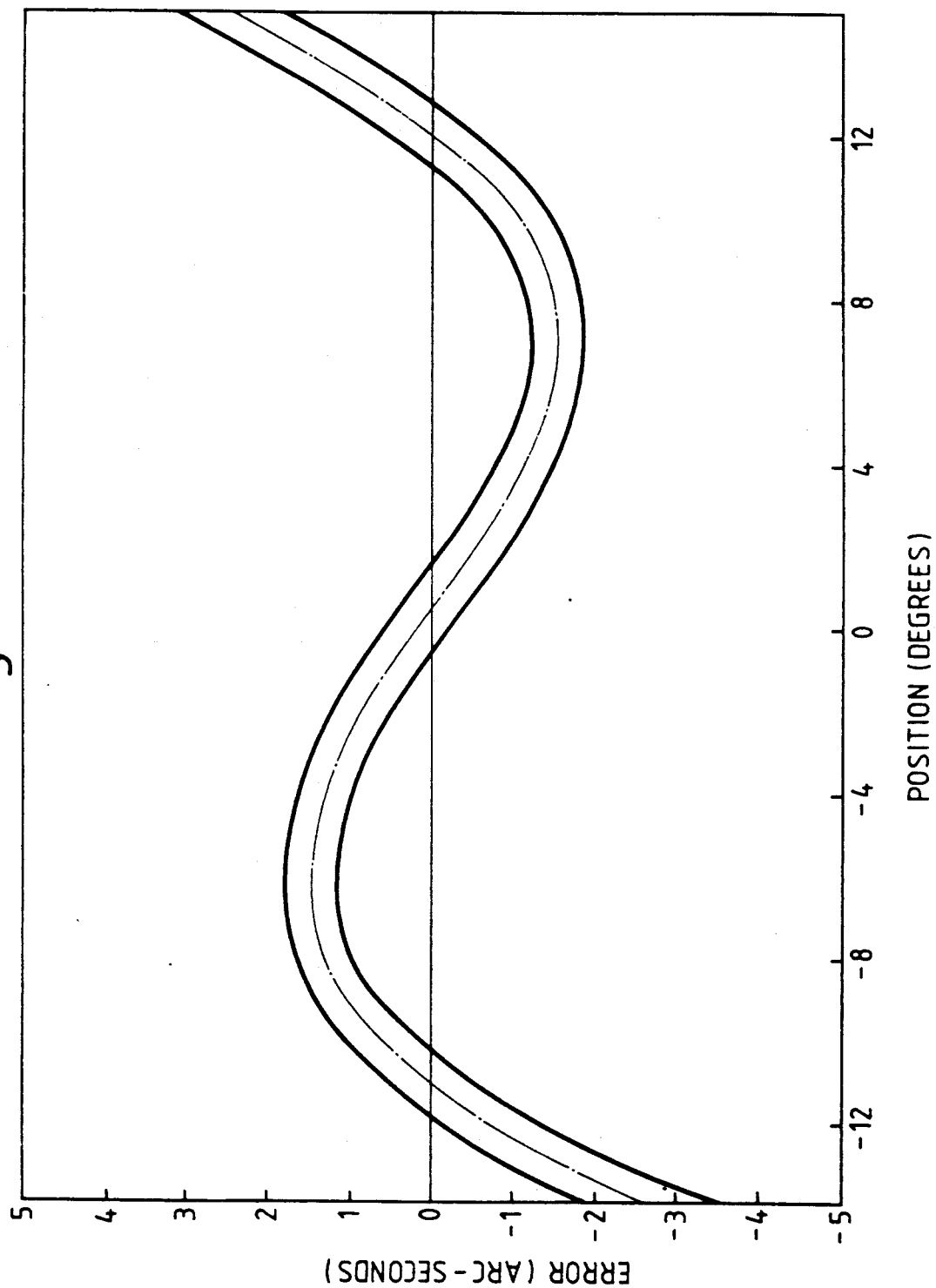
FIG. 6 is a plot of systematic errors in the interferometer.

The second reason for overlapping the zones is that the systematic error due to the table may be eliminated in order to error map the systematic errors in the interferometer. To do this, the errors $\bar{\epsilon}_{ij}$ on corresponding data points j in each of the zones $i,..i+23$ are added together, and have been found to lie on a polynomial curve within the ranges shown in the plot on FIG. 6. At present we attribute this systematic error to the optics of the system since the "form" of the polynomial curve is the same for all zones. The presence of this polynomial error can be eliminated in two ways:

a) if for example accuracy is required to within 0.1 arc seconds then it can be seen from the plot in FIG. 6 that an angular displacement of approximately 10° either side of the center of the zone will not generate an error greater than this value, and that limiting the taking of data points to within this angular displacement will achieve the desired result. Furthermore, it can be seen from FIG. 6 that the error values in this range are substantially linear and thus the process of solving equations (11) to (13) by least squares analysis will adjust the scale factor accordingly; this therefore eliminates these errors automatically.

b) if data points over a net angular displacement of 29° are required, a computer program either with a look-up table or a polynomial fit routine for computing the error will virtually eliminate the errors from the data plot.

With some rotary tables, depending upon the bearing system on which they are mounted it is necessary to rotate the table through 720° in order to obtain total calibration. For example with a sealed bearing, a 360° rotation of one of the bearing members relative to the other will produce only a 180° rotation of the race of balls in the bearing. Other multiples of rotation may be required for other bearing arrangements.

An equally valid approach, is instead of trying to solve equation (10) directly, is to solve a polynominal equation in $\Theta$.

Since from equation (9)

$$R = -Ro + A \sin \Theta + B \cos \Theta \tag{9}$$

and $$\sin \Theta = \Theta - \frac{\Theta^3}{3!} + \frac{\Theta^5}{5!} \ldots \tag{20}$$

$$\cos \Theta = 1 - \frac{\Theta^2}{2!} + \frac{\Theta^4}{4!} \ldots \tag{21}$$

we may write $$R = B - Ro + A\Theta - \frac{B\Theta^2}{2!} - \frac{A\Theta^3}{3!} + \frac{B\Theta^4}{4!} + \frac{A\Theta^5}{5!} + \ldots \tag{22}$$

and hence in general $$R = a + b\Theta + c\Theta^2 + d\Theta^3 + e\Theta^4 + f\Theta^5 + \ldots \tag{23}$$

It is thus possible to solve this equation (23) directly (using e.g. commercially available polynomial fitting routines) with the data collected in the manner described above rather than with the three simultaneous equations (11), (12) and (13).

A further alternative approach is to employ an error minimization technique known as "minimum zone", as set out in German Standard VDE 2617. This fits data to within a minumum error band.

For example, where $$R + R_o K \sin(\Theta - \Theta_o)$$

$$\epsilon + \Theta - [\sin^{-1}(R + R_o/2) + \Theta_o]$$

$R_o$, K and $\Theta_o$ to all altered by iteration to determine a minimum range of $\epsilon$.

I claim:

1. A method of calibrating a rotatable object table having an object stator, an object rotor rotatable relative to the object stator, and measuring means for measuring an angular displacement of the object rotor relative to the object stator from a datum, the method using a calibration apparatus comprising an intermediate rotatable table having an intermediate stator connected to the object rotor for rotation therewith, an intermediate rotor for rotation relative to the intermediate stator, and an angular interferometer for measuring an angular displacement of the intermediate rotor, the method comprising the steps of:
    a) rotating jointly, in incremental steps, the object rotor, the intermediate stator and the intermediate rotor relative to the object stator, from a first position of angular displacement relative to said datum, to a second position of angular displacement;
    b) measuring, at each incremental step, the angular displacement of the object rotor relative to the datum as measured by the measuring means, and taking an angular interferometer reading;
    c) counter rotating the intermediate rotor relative to the object stator, the object rotor, and the intermediate stator when the angular displacement is at said second position; and
    d) reiterating steps (a) to (c).

2. A method according to claim 1 further comprising the step, immediately prior to step (c), of:
    (e) counter rotating jointly the object rotor, the intermediate stator and the intermediate rotor relative to the object stator.

3. A method according to claim 2 wherein subsequent to the counter rotation of steps (c) and (e), the intermediate rotor occupies a position relative to said object stator having substantially said first position of angular displacement.

4. A method according to claim 1 further comprising the steps of:
    (f) deriving from the equation:

$$R + R_o = K \sin(\Theta - \Theta_o)$$

where
    R = interferometer reading
    $R_o$ = offset in interferometer reading
    K = scale factor
    $\Theta$ = reading of measuring means
    $\Theta_o$ = offset in reading of measuring means
    three orthogonal simultaneous equations;
    g) using measured values of R and $\Theta$ to solve these equations for values of $R_o$, $\Theta_o$ and K;
    h) determining, by using the values of $R_o$, $\Theta_o$ and K, a value of angular displacement ($\Theta_{interferometer}$) calculated from the interferometer reading R; and
    i) calculating the difference between $\Theta$ and $\Theta$ interferometer, said difference being the error in the value of $\ominus$.

5. A method according to claim 1 further comprising the step, immediately subsequent to step (c), of:
    (e) counter rotating jointly the object rotor, the intermediate stator and the intermediate rotor relative to the object stator.

6. A method according to claim 5 wherein subsequent to the counter rotation of steps (c) and (e), the intermediate rotor occupies a position relative to said object stator having substantially said first position of angular displacement.

7. A method according to claim 2, wherein said counter rotation of step (e) counter rotates the object rotor, the intermediate stator and the intermediate rotor to a position which lies between the first position and the second position of angular displacement.

8. A method according to claim 5, wherein said counter rotation of step (e) counter rotates the object rotor, the intermediate stator and the intermediate rotor to a position which lies between the first position and the second position of angular displacement.

* * * * *

REEXAMINATION CERTIFICATE (3218th)

United States Patent [19]

Chaney

[11] B1 5,237,390

[45] Certificate Issued Jun. 10, 1997

[54] METHOD AND APPARATUS FOR MEASUREMENT OF ANGULAR DISPLACEMENT

[75] Inventor: Raymond J. Chaney, Berkeley, United Kingdom

[73] Assignee: Renishaw plc, Wotton-Under-Edge, United Kingdom

Reexamination Request:
No. 90/003,970, Sep. 19, 1995

Reexamination Certificate for:
Patent No.: 5,237,390
Issued: Aug. 17, 1993
Appl. No.: 820,695
Filed: Jan. 27, 1992

[22] PCT Filed: Jun. 17, 1991

[86] PCT No.: PCT/GB91/00968

§ 371 Date: Jan. 27, 1992

§ 102(e) Date: Jan. 27, 1992

[87] PCT Pub. No.: WO91/19958

PCT Pub. Date: Dec. 26, 1991

[30] Foreign Application Priority Data

Jun. 15, 1990 [GB] United Kingdom .................. 9013390

[51] Int. Cl.$^6$ ...................................................... G01B 11/00
[52] U.S. Cl. ..................... 356/363; 356/345; 356/349; 356/372; 250/231.13; 33/1 N

[56] References Cited

PUBLICATIONS

*An American National Standard,* "Axes of Rotation, Methods for Specifying and Testing," sponsored and published by The American Society of Mechanical Engineers, Issued Jan. 31, 1986, pp. 39–42.

*Foundations of Mechanical Accuracy,* by Wayne R. Moore, ©The Moore Special Tool Company 1970.

"Application of A Laser Interferometer for The Calibration of Angular Indexing," by Kuang–Chao Fan, *Journal of the Chinese Society of Mechanical Engineers,* 1988, vol. 9, No. 1, pp. 63–69. (FAN D).

Hewlett–Packard Company User's Guide for "5526A Laser Measurement System," pp. 44 and 45, ©1980.

Thesis "Development of a Laser Calibration Technique for Precision Rotary Index Tables," by T. D. Hubbard, May 1982. (MB2).

Thesis "Computer–Aided Calibration of the Accuracy Performance of NC Machine Tools," by Kuang–Chao Fan, published Manchester; UMIST, May 1984, Barcode q1008529, Thesis collection P3029. (FAN MB3).

Dissertation "Application of a Laser Interferometer for the Angular Indexing Calibration of Rotary Axes on Machining Centres," by K.L. Lee, Oct. 1988.

Sales Invoice, dated 30 Mar. 1990, from C.D. Measurements Ltd., to The Invoice Section, A.W.E., and Order No. AC 45694/A1, dated 18 Dec. 1989.

Photo of calibration apparatus sold by C.D. Measurements within the invoices shown in Exhibits MB5 and MB6, showing that the apparatus did not have any scale.

Proceedings of the Twenty–Eight International Matador Conference, edited by B. J. Davies, Department of Mechanical Engineering, University of Manchester Institute of Science and Technology, in association with MacMillan Education, Apr. 18–19, 1990.

*Primary Examiner*—Samuel A. Turner

[57] ABSTRACT

A rotatable object table which has a stator (112) a rotor (114), and positioning servo and measuring system (16). The system (16) is calibrated using an angular interferometer and an intermediate table having stator 122 and rotor 124. Values of angular displacement of stator 124 are determined by the interferometer by solving 3 orthogonal simultaneous equations derived from the equation $R+R_o=K \sin(\theta-\theta_o)$, and are compared with corresponding angular displacement as determined by the system (16).

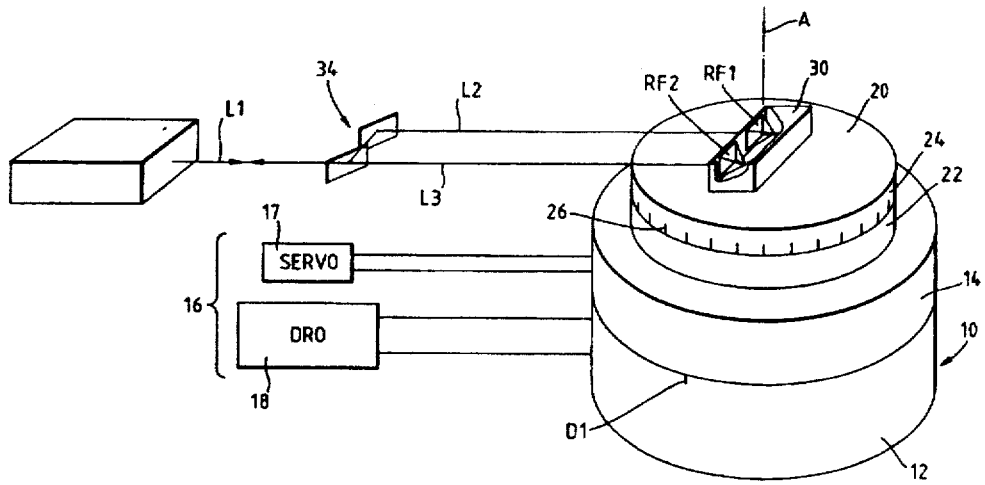

REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1–8 are cancelled.

* * * * *